United States Patent [19]

Gray et al.

[11] 4,169,030

[45] Sep. 25, 1979

[54] LIGHT ASSISTED REACTIONS OF DINUCLEAR DIISOCYANO LIGAND BRIDGED COMPLEXES

[75] Inventors: Harry B. Gray, Pasadena, Calif.; Kent Mann, Roseville, Minn.; Nathan Lewis, Cambridge, Mass.

[73] Assignee: California Institute of Technology, Pasadena, Calif.

[21] Appl. No.: 930,509

[22] Filed: Aug. 3, 1978

[51] Int. Cl.$^2$ .............................................. B01J 1/10
[52] U.S. Cl. .......................... 204/157.1 R; 204/158 R; 204/162 R
[58] Field of Search .................. 204/157.1 R, 158 R, 204/162 R

[56] References Cited

U.S. PATENT DOCUMENTS 3,154,586  10/1964  Bander et al. ................... 204/162 R

OTHER PUBLICATIONS

C & E N (Aug. 1, 1977), pp. 15 & 16.

Primary Examiner—Howard S. Williams
Attorney, Agent, or Firm—Marvin E. Jacobs

[57] ABSTRACT

A complex ion containing rhodium, $Rh_2(1,3\text{-diisocyanopropane})_4{}^{2+}$ is called "rhodium bridge." Because of the nature of its molecular structure, it is deep blue in water solution. Irradiation of the blue complex between 500 and 600 nm leads to direct reduction of the protons in water to hydrogen gas. In this reaction rhodium bridge is converted to a yellow form, in which each of the two rhodiums has lost one electron. The $H_2$-producing visible photoreaction of rhodium bridge can be utilized in a solar-driven water splitting cycle.

15 Claims, 3 Drawing Figures

LIGHT ASSISTED REACTIONS OF DINUCLEAR DIISOCYANO LIGAND BRIDGED COMPLEXES

ORIGIN OF THE INVENTION

The Government has rights in this invention pursuant to Grant #CHE77-11389 awarded by the National Science Foundation.

BACKGROUND OF THE INVENTION

1. Field of the Invention

The present invention relates to the photoreactions of dinuclear diisocyanide ligand bridged complexes and, more particularly to the visible light assisted production of hydrogen fuel from water.

2. Description of the Prior Art

Self-sufficiency in energy is a stated national goal. Most of the proposed means to achieve this goal are either environmentally unacceptable or are not feasible, especially those not depending on fossil fuel sources. Of the currently available alternatives, solar energy is the most abundant, inexhaustible single resource available. However, capturing and utilizing solar energy is not simple. Methods are being sought to convert solar energy to a concentrated, storable form of energy. A known method, photosynthesis, converts somewhat less than 1% of the sun's energy at the earth's surface to a solid fuel, i.e., plant materials, which when accumulated and transformed over geologic ages yielded fossil fuels. Current rates of use of these fossil fuels, and the particular geographic distribution and political control of major petroleum resources pose problems for nations that are net petroleum consumers. An alternate method yielding a simpler fuel, at a higher conversion, has long been desired.

Production of hydrogen by the solar photolysis of water would be an extremely desirable fuel, since it would be prepared in high purity, and the combustion product of hydrogen is water which is totally environmentally acceptable. However, it is widely believed that solar photolysis of water is not feasible, especially at a reasonable quantum efficiency.

SUMMARY OF THE INVENTION

Dinuclear transition metals complexed with four binucleating diisocyanides bridge ligands have previously been reported. These dirhodium tetra-diisocyanopropane dimers undergo two-center oxidative addition reactions with several substrates. The orbital interactions between the directly coupled metal centers give rise to striking electronic absorption properties, the most prominent being a low-lying system attributable to the $^1A_{1g} \rightarrow {}^1A_{2u}(1a_{2u} \rightarrow 2a_{1g})$ excitation.

It has now been discovered from a study of the excited state reactivity behavior of directly coupled dinuclear redox center of these complexes that charge-transfer excitation energy can be channeled into redox-substrate chemical bond formation at rates which are competitive with back electron transfer.

This reaction was achieved in a very important case, namely in the reduction of protons to hydrogen by visible (500–600 nm) irradiation of an aqueous HCl solution at the blue $Rh_2(bridge)_4^{2+}$ (bridge=1,3-diisocyanopropane). The bridge protonates, and upon irradiation the protonated complex yields $H_2$ and a yellow oxidative-addition product $Rh_2(bridge)_4Cl^{2+}$ in which each of the two rhodiums has lost one electron. This reaction may be used to produce $H_2$ in solar energy conversion schemes.

These and many other features and attendant advantages of the invention will become readily apparent as the invention becomes better understood by reference to the following detailed description when considered in conjunction with the accompanying drawings.

DESCRIPTION OF THE PREFERRED EMBODIMENTS

Figure 1:
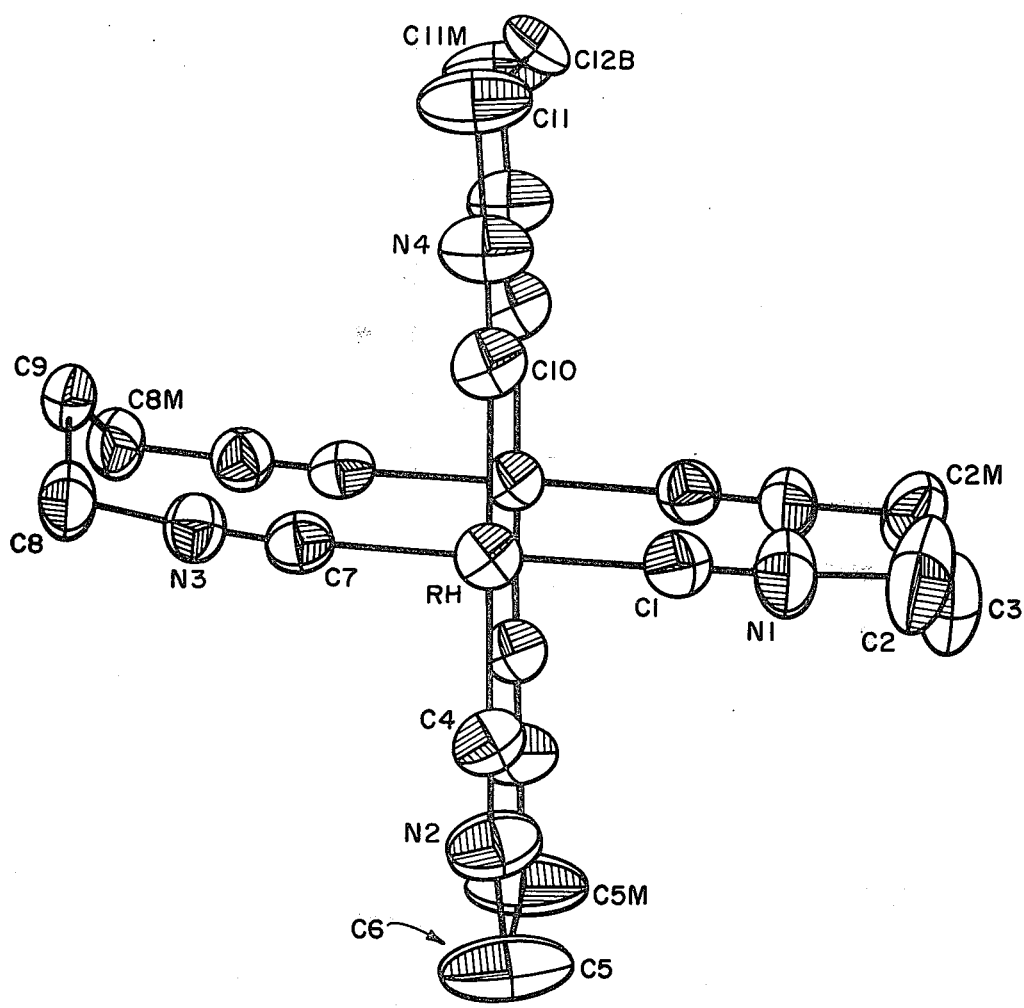
FIG. 1 is a structural formula of rhodium bridge.

Various reducible substrates can be reduced during the light assisted oxidation of the dinuclear transition metal complex according to the following general reaction:

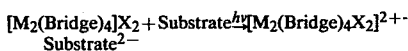

$$[M_2(Bridge)_4]X_2 + Substrate \xrightarrow{h\nu} [M_2(Bridge)_4X_2]^{2+} + Substrate^{2-}$$

where M is a transition metal, Bridge is a diisocyanide and X is an anion. Irradiation of the complex leads to conversion of the complex to an oxidized form and to the production of reduced substrate. In the case of acidic water the complex protonates, binds anion and produces $H_2$ probably by a two-electron transfer process.

The transition metal can be selected from metals in the platinum group such as rhodium, cobalt, iridium, platinum, palladium, nickel, osmium, ruthenium or iron. The anion is selected depending on whether the complex is to be utilized in aqueous or organic media. Suitable anions are halides, boron tetrafluoride, tetraphenyl borate or hexafluorophosphate.

The Bridge ligand can be any dinucleating diisocyanide particularly aliphatic diisocyanides containing 2 to 20 carbon atoms such as 1,3-diisocyanopropane, 1,4-diisocyanobutane (4-Bridge), 2,5-dimethyl-2,5-diisocyanohexane (TM-4 Bridge) and 1-methyl-cis-1-isocyano-4(1-methyl-1-isocyanoethyl) cyclohexane (Cyclo-5-Bridge).

The structure and names of other dinucleating diisocyanides are illustrated in Tables 1 and 2 which follow:

TABLE 1

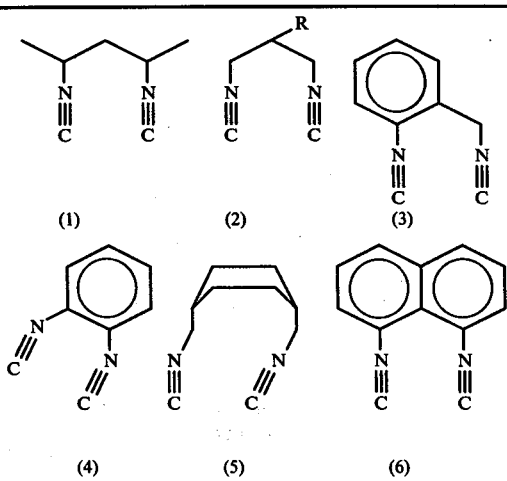

TABLE 1-continued

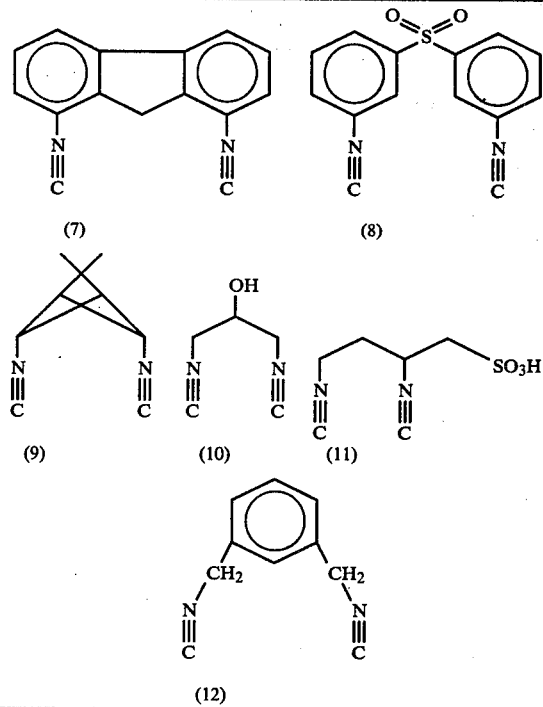

TABLE 2

Names of Ligands 1. 2,4 diisocyano pentane
2. 2-substituted-1,3 diisocyanopropane
3. 1-isocyano benzylisocyanide
4. 1,2-diisocyanobenzene
5. 1,4-diisocyanocyclohexane
6. 1,8-diisocyanonapthalene
7. 1,8-diisocyanofluorene
8. m-isocyanophenyl sulfone
9. 1,3-diisocyano 2,2,4,4 tetramethylcyclobutane
10. 1,3-diisocyano,2-hydroxy propane
11. 2,4-diisocyano butanesulfonic acid
12. $\alpha,\alpha'$ diisocyano-m-xylene The chloride salt of the complexes are prepared by addition of the diisocyanide bridge ligand to a stoichiometric amount of [Rh(COD)Cl]$_2$ in chloroform solution where COD is 1,5-cyclooctadiene. The latter compound was synthesized by a standard method: J. Chatt and L. M. Venanzi, *J. Chem. Soc.*, 4735 (1957). Experiments follow:

EXAMPLE 1

1,3-diisocyanopropane(bridge)—To a 3 liter, 3-necked flask equipped with overhead stirrer and two Claisen condensors was added 600 ml of a 50% aqueous solution of NaOH (prepared by mixing excess solid NaOH and water and allowing the phases to come to equilibrium at 25° C. over several days) and 170 ml (2.1 moles) of chloroform. 500 ml of dichloromethane was added as solvent, followed by 84 ml (1 mole) of 1-3-diaminopropane (Aldrich Chemical Company) and finally, 2.1 g of the phase-transfer catalyst, benzyl-triethylammonium chloride. The mixture was then rapidly stirred until refluxing of the dichloromethane was observed. When the rate of reflux becomes excessive, the stirring rate is decreased to slow the reaction; caution is advised, as pressure explosions of solvent gushing out the condensors may occur if the reaction rate is too rapid. The flask temperature should be maintained at about 40° C. for 30 minutes, after which the stirring may be accelerated once again. The reaction mixture is stirred for about three additional hours, and the solution will have darkened slightly due to formation of polymeric side product. The layers are separated, and the organic phase is washed four times with 500 ml portions of water. The solvent is then removed, and the ligand is purified by vacuum distillation. The bridge distills at 55° C. at 1 mm Hg as a clear liquid. Use extreme care while distilling the product. The infrared spectrum of the ligand shows a very strong and narrow $\nu$ (C≡N) stretch at 2140 cm$^{-1}$, with other prominent peaks at 2930 (m), 1660 (m), and 1490 (s) cm$^{-1}$. The 60 MHz PMR spectrum of bridge exhibits two multiplets integrated in the ratio of 2:1, the first is a triplet of triplets at 3.48 $\delta$ (terminal CH$_2$), and the second is a complex multiplet centered at 1.76 $\delta$ (central CH$_2$). With small amounts of the material, an alternative, safer purification is elution of crude product with toluene over alumina, with pure bridge being the first fraction off the column.

EXAMPLE 2

Rh$_2$(L)$_4$(PF$_6$)$_2$, where L=TM 4-Bridge, 4-Bridge or Cyclo 5-Bridge, were prepared as follows: 0.630 g AgPF$_6$ (2.5 mmol) was added to 25 ml of a stirred acetonitrile solution containing 0.616 g (1.25 mmol) [Rh(COD)Cl]$_2$. The AgCl precipitate was filtered and then either 0.822 g of TM 4-Bridge or 0.95 g Cyclo 5-Bridge was added to the light yellow filtrate. Diethyl ether was added and the resulting precipitate was recrystallized from acetonitrile/ether and air dried. Yields were about 80%. Rh$_2$(TM 4-Bridge)$_4$(PF$_6$)$_2$—Anal. Calcd: C, 41.68; H, 5.60; N, 9.72. Found: C, 41.38; H, 5.47; N, 10.08; $\nu$(CN) 2152 cm$^{-1}$ CH$_2$Cl$_2$. Rh$_2$(Cyclo 5-Bridge)$_4$(PF$_6$)$_2$—Anal. Calcd: C, 45.87; H, 5.77; N, 8.92. Found: C, 46.01; H, 5.60; N, 9.09; $\nu$(CN) 2160 cm$^{-1}$ CH$_2$Cl$_2$ solution. 4-Bridge, TM 4-Bridge, and Cyclo 5-Bridge were prepared from the corresponding amines by the method of W. P. Weber, et al., *Angew. Chem. Internat. Ed.*, 11, 530 (1972). 4-Bridge was purified by vacuum distillation; TM 4-Bridge and Cyclo 5-Bridge were purified by recrystallization from CH$_2$Cl$_2$. The infrared spectra and NMR spectra are as follows: 4-Bridge; IR, 2145 cm$^{-1}$ $\bar{\nu}$(CN), neat; TM 4-Bridge, IR, 2126 cm$^{-1}$ $\bar{\nu}$(CN) CH$_2$Cl$_2$.

EXAMPLE 3

Co$_2$(TM 4-Bridge)$_4$(CoCl$_4$)$_2$.4H$_2$O—To a stirred solution of 0.30 g (1.26 mmoles) of CoCl$_2$.6H$_2$O in 50 ml of anhydrous ethanol was added 0.25 g (1.52 mmoles) of TM 4-Bridge. The resulting green solution was refrigerated for three days affording green crystals of Co$_2$(TM 4-Bridge)$_4$(CoCl$_4$)$_2$.4H$_2$O. Calcd: C, 38.49; H, 5.30%; N, 8.89%. Found: C, 38.49%; H, 5.81%, 8.98%.

EXAMPLE 4

Rh$_2$(bridge)$_4$(BF$_4$)$_2$—To a solution of 1.23 g of (Rh(COD)Cl)$_2$ in 20 ml of acetonitrile was added 0.97 g of silver tetrafluoroborate in 10 ml of acetonitrile. The solution was stirred and filtered by gravity to remove the silver chloride formed. Then 0.94 g of 1,3-diisocyanopropane bridge in 10 ml of acetonitrile was added dropwise with stirring to the rhodium solution.

The purple powder was filtered, washed with diethyl ether, and dried in vacuo. This salt is soluble in acetonitrile, dimethylformamide and dimethylsulfoxide. Calcd: C, 31.78; H, 3.20; N, 14.82; F, 20.11. Found: C, 31.62; H, 3.37; N, 14.66; F, 19.82.

EXAMPLE 5

$Rh_2(bridge)_4Cl_2$—This compound was obtained by adding a stoichiometric amount of 1,3-diisocyanopropane bridge to a chloroform solution of $(Rh(COD)Cl)_2$ and filtering the blue precipitate, washing with diethyl ether, and drying in vacuo. The blue precipitate is soluble in methanol, water, dimethylsulfoxide and dimethylformamide.

The bridged dirhodium complex with 1,3-diisocyanopropane of Example 5, $Rh_2(1,3\text{-diisocyanopropane})_4^{2+}$ system has been investigated in more detail. This cation is called rhodium bridge because of the nature of its molecular structure. A view of this cation based on X-ray crystal structure analysis is shown in FIG. 1. The dinuclear complex has near $D_{4h}$ symmetry, with a Rh—Rh distance of 3.26 Å. The occupied $d_{z^2}$ orbitals on each $d^8$ planar Rh(I) center interact, yielding two MO's of symmetries $a_{1g}$ and $a_{2u}$; and the lowest unoccupied monomer orbitals (of $a_{2u}$ symmetry) also interact and split into $a_{1g}$ and $a_{2u}$ levels in the binuclear complex. The orbitals of interest in discussing the low-lying absorption and emission bands, and the photochemistry, are, in order of increasing energy, $1a_{1g} < 1a_{2u} < 2a_{1g} < 2a_{2u}$. The ground state of $Rh_2(bridge)_4^{2+}$ is $^1A_{1g}\ (1a_{1g}^2 1a_{2u}^2)$.

The intense absorption band in the spectrum of $Rh_2(bridge)_4^{2+}$ at 553 nm ($\epsilon$ 14,500) in acetonitrile solution is attributed to $^1A_{1g} \rightarrow {}^1A_{2u}\ (1a_{2u} \rightarrow 2a_{1g})$, which is an allowed transition. The band falls well to the red of the analogous $^1A_{1g} \rightarrow {}^1A_{2u}(d_{z^2} \rightarrow a_{2u})$ transition in a reference monomeric complex (e.g., this band in the spectrum of $Rh(CNEt)_4^+$ peaks at 380 nm), which illustrates the importance of the axial orbital interactions ($d_{z^2}$-$d_{z^2}$ and $a_{2u}$-$a_{2u}$) in the rhodium bridge binuclear case.

Bright red emission is observed upon excitation of $Rh_2(ridge)_4^{2+}$ at 553 nm in acetonitrile solution. The emission peaks at 656 nm and the quantum yield (undegassed) is 0.56. The lifetime of the emission is very short ($\leq 2$ ns), suggesting that the transition is spin-allowed, $^1A_{2u} \rightarrow {}^1A_{1g}$. Excitation of $Rh_2(bridge)_4^{2+}$ at 553 nm also gives rise to a relatively long-lived transient species ($\tau = 3.3\ \mu s$) that absorbs strongly between 400 and 500 nm. This transient is believed to be the $^3A_{2u}$ excited state of $Rh_2(bridge)_4^{2+}$.

Irradiation of a blue 12 M HCl solution of $Rh_2(bridge)_4^{2+}$ at 546 nm leads to a clean conversion to a yellow product and $H_2$. The absorption spectrum of the yellow product is identical to that of a sample of $[Rh_2(bridge)_4Cl_2]^{2+}$ prepared by $Cl_2$ oxidation of $[Rh_2(bridge)_4]^{2+}$ in 12 M HCl solution. It has been shown in several independent experiments that $Rh_2(bridge)_4^{2+}$ protonates in acidic aqueous solutions and that in HX (X=Cl, Br, I), this protonated complex binds $X^-$ as well. Thus the photoreaction in 12 M HCl can be formulated:

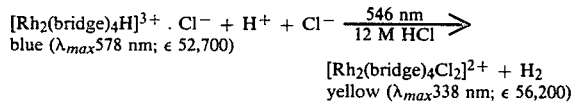

$[Rh_2(bridge)_4H]^{3+} \cdot Cl^- + H^+ + Cl^- \xrightarrow[\text{12 M HCl}]{546\ nm}$
blue ($\lambda_{max} 578$ nm; $\epsilon$ 52,700)

$[Rh_2(bridge)_4Cl_2]^{2+} + H_2$
yellow ($\lambda_{max} 338$ nm; $\epsilon$ 56,200)

The photoreaction is uphill and is not inhibited by the presence of 1 atm of $H_2$ at 28° C. Under such conditions the thermal back reaction between $[Rh_2(bridge)_4Cl_2]^{2+}$ and $H_2$ yield $[Rh_2(bridge)_4H]^{3+} \cdot Cl^-$ requires several days to go to completion. Studies of the kinetics of the back reaction are not finished, but it is known that at high $[Cl^-]$ the reaction is first order in $[H_2]$ and inverse first order in $[Cl^-]$.

Results of a study of the dependence of the quantum yield for the photooxidation of $[Rh_2(bridge)_4H]^{3+} \cdot X^-$ on the activities of $H^+$ and $X^-$ are set out in Table 3.

TABLE 3

| Quantum Yields for the Photooxidation of $Rh_2(bridge)_4^{2+}$ in HX Solutions at 29° C. ||
|---|---|
| [HCl], M | $10^2\Phi(\text{degassed})^a$ |
| 12.8 | 0.79 |
| 12.1 | 0.56 |
| 11.1 | 0.26 |
| 10.1 | 0.083 |
| 9.1 | 0.028 |
| 8.1 | 0.010 |
| 1.0 | too small to measure |
| [HBr], 9 M | 4.4 |

$^a$Based on measurements of the appearance of $Rh_2(bridge)_4X_2^{2+}$.

It is apparent that the photoreaction depends strongly both on $a_{H^+}$ and the nature of $X^-$. The highest quantum yield of 0.44 measured in 9 M HBr solution shows that $Br^-$ is more effective than $Cl^-$ in promoting the photoreaction, though the experiments in HCl solutions establish that quantum yield of the photoreaction increases sharply as $a_{H^+}$ increases. The data are consistent with a mechanism in which the key step involves attachment of $H_3O^+$ on an excited $[Rh_2(bridge)_4H]^{3+} \cdot Cl^-$ species, producing $H_2$ directly in a two-electron transfer process. The molarity of the acid is at least 8, preferably at least 12.

It has been shown that it is possible to achieve an uphill reduction of protons to hydrogen by visible excitation of a binuclear Rh(I) complex. The charge transfer excited state involved in the photoreaction must be $^1A_{2u}$ or $^3A_{2u}$. In either case, the MO configuration is $(1a_{1g})^2(1a_{2u})^1(2a_{1g})^1$. If it is assumed, as seems reasonable, that the $2a_{1g}$ level possesses substantial 1s(H) character, then the excited state may be formulated as $[(Cl^-)-Rh^{I\frac{1}{2}}-(H\cdot)]^{2+*}$. Attack by $H_3O^+$ could induce a second electron transfer ($1a_{2u}-H\cdot$), yielding $H_2$ and the two-electron oxidative-addition product, $[Rh_2(bridge)_4Cl_2]^{2+}$:

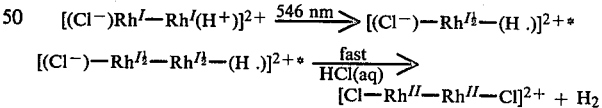

$[(Cl^-)Rh^I-Rh^I(H^+)]^{2+} \xrightarrow{546\ nm} [(Cl^-)-Rh^{I\frac{1}{2}}-(H\cdot)]^{2+*}$ $[(Cl^-)-Rh^{I\frac{1}{2}}-Rh^{I\frac{1}{2}}-(H\cdot)]^{2+*} \xrightarrow[\text{HCl(aq)}]{\text{fast}} [Cl-Rh^{II}-Rh^{II}-Cl]^{2+} + H_2$ It is attractive to propose that axial ligand-metal interactions may operate so as to reduce the fraction of excited species returning to the $Rh^I-Rh^I$ ground state by back electron transfer. The $\sigma$ binding interactions along the internuclear axis Cl—Rh—Rh—H in a $(1a_{1g})^2(1a_{2u})^1(2a_{1g})^1$ excited state are predicted to be larger than in the ground state $[1a_{1g})^2(1a_{2u})^2]$; therefore, these interactions favor the $H_2$-producing pathway ($1a_{2u} \rightarrow H\cdot$) over back transfer ($2a_{1g} \Delta 1a_{2u}$) as the energy of the $1a_{2u}\ \sigma^*$ level increases sharply as the extent of Cl—Rh—Rh—H coupling increases.

Figure 2:
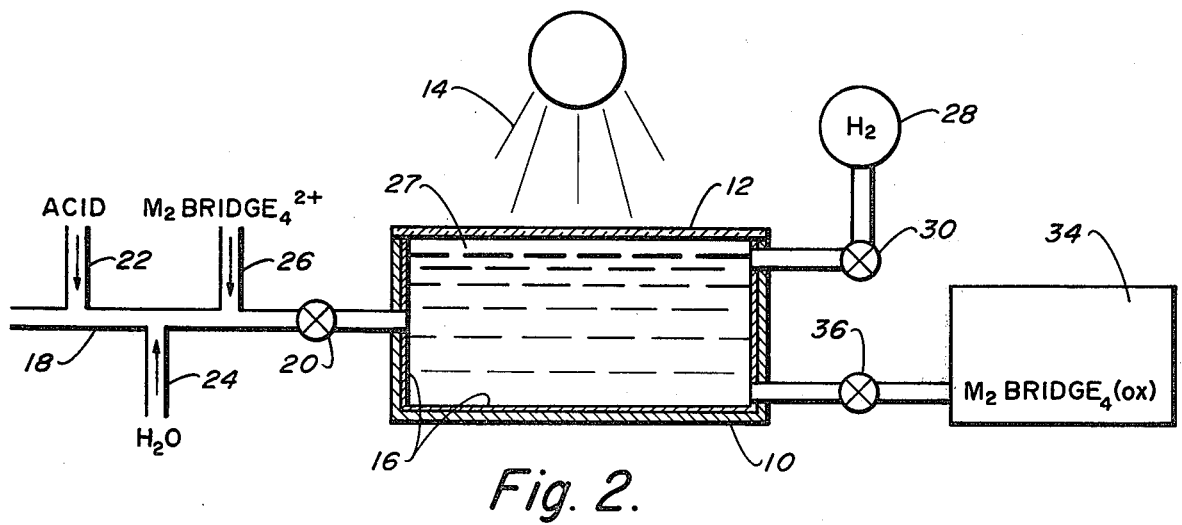
FIG. 2 is a schematic view of a solar-hydrogen generator in accordance with this invention.

Referring now to FIG. 2 a solar hydrogen generator would include a reactor 10 having an upper panel 12 transparent to ground level solar rays 14 and preferably having reflective inner surfaces 16. An inlet 18 is provided having a valve 20 and which receives controlled amounts of acid (HX) water and reductant ($M_2Bridge_4^{2+}$) from lines 22, 24, 26 respectively. As the solution 27 is exposed to visible light, hydrogen is generated which collects in storage tank 28 when valve 30 is open. The reductant is oxidized to $M_2(Bridge)_4X_2^{2+}$ which is recovered in tank 34 when valve 36 is open. The spent reagent can be utilized as an oxidant in other reactions and can be regenerated and recycled to the reactor 10 as shown in FIG. 3.

Figure 3:
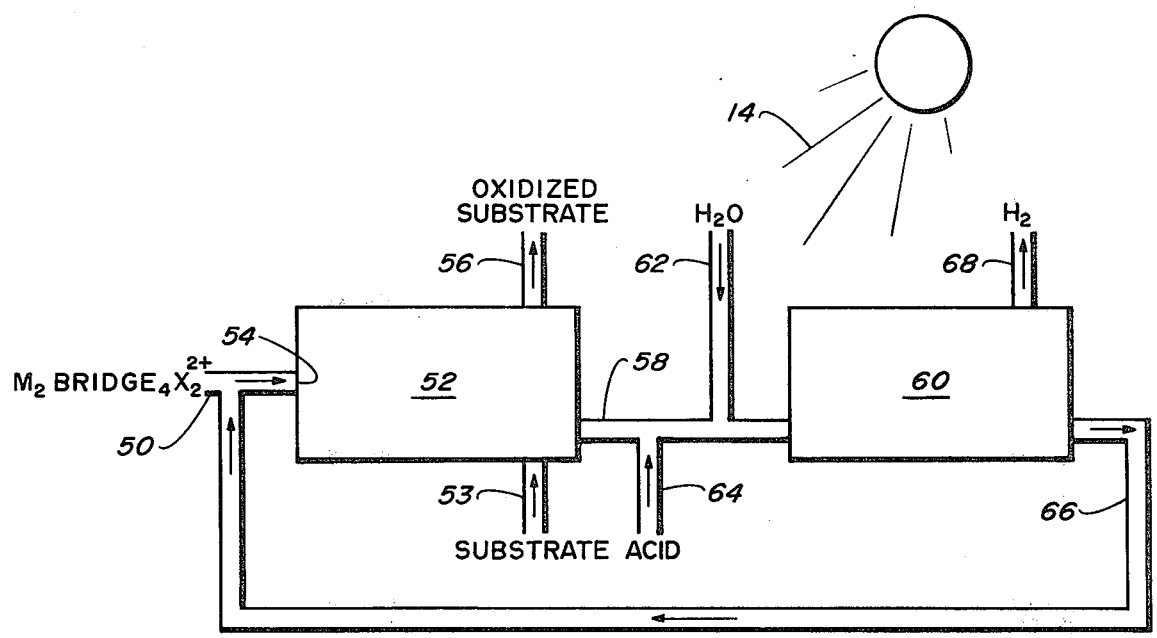
FIG. 3 is a schematic view of a solar assisted cyclic redox process in accordance with this invention.

In FIG. 3 a cyclic redox system is illustrated in which $M_2(Bridge)_4X_2^{2+}$ from line 50 is fed into reactor 52 through inlet 54. An oxidizable substrate such as an oxidizable hydrocarbon is added through line 53 as a liquid or is bubbled through the solution as a gas. The substrate is oxidized while the $M_2(Bridge)_4X_2^{2+}$ is reduced. Oxidized substrate is recovered through outlet 56 while the reduced bridge is transferred through line 58 to solar regenerator 60 along with water and acid through feed lines 62, 64. The reduced Bridge is oxidized and recycled to reactor 52 through recycle line 66 while $H_2$ is recovered through line 68. The oxidizable substrate may be compounds such as ethylene, propylene, methanol, acetylene or the like and this reaction can be utilized to produce valuable chemicals such as ethylene or propylene oxides or aldehydes, ketones or acids.

It is to be realized that only preferred embodiments of the invention have been described and that numerous substitutions, modifications and alterations are permissible without departing from the spirit and scope of the invention as defined in the following claims.

What is claimed is:
1. A photoreduction process comprising the steps of:
    (a) irradiating $(M_2(Bridge)_4)X_2$ reductant with visible light in the presence of substrate where M is a transition metal, Bridge is a dinnucleating diisocyanide and X is an anion to form an excited state of the reductant;
    (b) reducing the substrate with the excited reductant and generating a higher oxidized state of the reductant of the formula; $(M_2(Bridge)_4X_2)^{2+}$;
    (c) separating the reduced substrate from the oxidized reductant;
    (d) combining the oxidized reductant with an oxidizable substrate;
    (e) oxidizing the oxidizable substrate while reducing the oxidized reductant to said reductant form; and
    (f) separating the reductant from oxidized substrate and recycling the reductant to step (a).
2. A method in accordance with claim 1 in which the transition metal is a platinum group metal.
3. A method according to claim 2 in which the metal is selected from rhodium, cobalt, iridium, platinum, palladium, nickel, osmium, ruthenium or iron.
4. A method according to claim 3 in which the dinucleating diisocyanide is selected from compounds of the formula $(CN)_2R$ where R is an organic divalent group containing 2 to 20 carbon atoms.
5. A method according to claim 4 in which X is selected from halo, tetraphenyl borate, $PF_6^-$ or boron tetrafluoride.
6. A method according to claim 5 in which R is selected from alkylene, arylene, alkarylene, cycloalkylene, alkylcyoalkylene or alkarylene.
7. A method according to claim 5 in which the diisocyanide is selected from 1,3-diisocyanopropane, 1,4-diisocyanobutane, 2,5-dimethyl-2,5-diisocyanohexane, cis-1-isocyano-4(2-isocyanopropyl)cyclohexane, 2,4-diisocyanopentane, 2-alkyl-1,3-diisocyanopropane, 1-isocyanobenzylisocyanamide, 1,2-diisocyanobenzene, 1,4-diisocyanocyclohexane, 1,8-diisocyanonaphthalene, 1,8-diisocyanofluorene, m-isocyanophenyl sulfone, 1,3-diisocyano-2,2,4,4,-tetramethylcyclobutane, 1,3-diisocyano-2-hydroxy propane, 2,4-diisocyanobutane sulfonic acid or $\alpha,\alpha'$-diisocyano-m-xylene.
8. A method according to claim 7 in which the metal is rhodium and the diisocyanide is 1,3-diisocyanopropane and the rhodium-rhodium separation is 3.26Å.
9. A method according to claim 1 in which the irradiation includes light having wavelength between 500 and 600 nm.
10. A method according to claim 9 in which the substrate is water and the anion is halo.
11. A method according to claim 10 in which the water contains hydrohalic acid at a molarity above 8 and molecular hydrogen gas is produced during the photoreduction reaction.
12. A method according to claim 11 in which the hydrohalic acid is HBr.
13. A method according to claim 1 in which the oxidizable substrate is an olefin.
14. A method according to claim 13 in which the olefin is selected from ethylene, or propylene.
15. A method according to claim 1 in which the oxidizable substrate is methanol or acetylene.

* * * * *